(12) United States Patent
Kim et al.

(10) Patent No.: US 9,786,985 B2
(45) Date of Patent: Oct. 10, 2017

(54) APPARATUS, SYSTEM AND METHOD OF BEAMFORMING TRAINING

(71) Applicant: INTEL IP CORPORATION, Santa Clara, CA (US)

(72) Inventors: Joongheon Kim, San Jose, CA (US); Carlos Cordeiro, Portland, OR (US); Ali S. Sadri, San Diego, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 528 days.

(21) Appl. No.: 14/469,840

(22) Filed: Aug. 27, 2014

(65) Prior Publication Data

US 2016/0065287 A1    Mar. 3, 2016

(51) Int. Cl.
| | |
|---|---|
| *H04B 7/00* | (2006.01) |
| *H01Q 3/00* | (2006.01) |
| *H04B 7/06* | (2006.01) |
| *H04B 7/08* | (2006.01) |

(52) U.S. Cl.
CPC .............. *H01Q 3/00* (2013.01); *H04B 7/0695* (2013.01); *H04B 7/088* (2013.01)

(58) Field of Classification Search
CPC ........ H01Q 3/00; H04B 7/0695; H04B 7/088; H04B 7/00
USPC .......................................................... 342/367
See application file for complete search history.

(56) References Cited

U.S. PATENT DOCUMENTS

| | | | | |
|---|---|---|---|---|
| 2009/0015478 A1* | 1/2009 | Li | ........................ | H04B 7/086 342/377 |
| 2010/0009635 A1* | 1/2010 | Qin | ........................ | H01Q 3/267 455/63.4 |
| 2010/0164805 A1* | 7/2010 | Niu | ........................ | H01Q 1/125 342/377 |
| 2010/0215027 A1* | 8/2010 | Liu | ........................ | H04B 7/0695 370/338 |
| 2013/0115887 A1* | 5/2013 | Kwon | ................... | H04B 7/0408 455/63.4 |
| 2013/0315325 A1* | 11/2013 | Wang | ..................... | H04B 7/043 375/267 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

(Continued)

*Primary Examiner* — Harry Liu
(74) *Attorney, Agent, or Firm* — Shichrur & Co.

(57) ABSTRACT

Some demonstrative embodiments include apparatuses, devices, systems and methods of beamforming training. For example, an apparatus may include a transmitter, a receiver, and a controller to repeat a beamforming training sequence including a transmit (Tx) mode and a receive (Rx) mode, at the Tx mode the transmitter is to transmit a directional Tx training signal to a wireless communication device, and at the Rx mode the receiver is to be at an omnidirectional Rx state, wherein subsequent to successful receipt of a directional Rx training signal from the wireless communication device at the receiver, the transmitter is to transmit the directional Tx training signal including an Rx beam indication to indicate a beam direction of the Rx training signal.

25 Claims, 5 Drawing Sheets

(56) References Cited

OTHER PUBLICATIONS

Wireless Gigabit Alliance (WGA) Specifications; WiGig MAC and PHY Specification Version 1.1, Apr. 2011—Final Specification; 442 pages.

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.15.3c™-2009. IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs) Amendment 2: Millimeter-wave-based Alternative Physical Layer Extension, Oct. 12, 2009, 203 pages.

\* cited by examiner

APPARATUS, SYSTEM AND METHOD OF BEAMFORMING TRAINING

TECHNICAL FIELD

Embodiments described herein generally relate to beamforming training.

BACKGROUND

A wireless communication network in a millimeter-wave band may provide high-speed data access for users of wireless communication devices.

A beam training procedure may be configured to steer a first directional antenna of a first wireless communication device, e.g., a beamforming initiator (BI), and a second directional antenna of a second wireless communication device, e.g., a beamforming responder (BR). The beam training procedure may be performed, for example, to establish a high throughout communication link between the BI and the BR, e.g., at an acceptable communication range between the BR and the BI.

The first and/or the second directional antennas may use high gain narrow beams. Each of the first and second directional antennas may be able to steer the beams in a large number of different directions. As a result, targeting the beams of the first and second antennas to establish the high throughout communication link may be relatively difficult.

Conventional beam training procedures for the millimeterWave (mmWave) Band require testing each pair of beam configurations, e.g., including a beam direction of each of the first and second antennas.

Accordingly, the beam training procedure may take a long period of time and may require testing a large number of beam settings.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
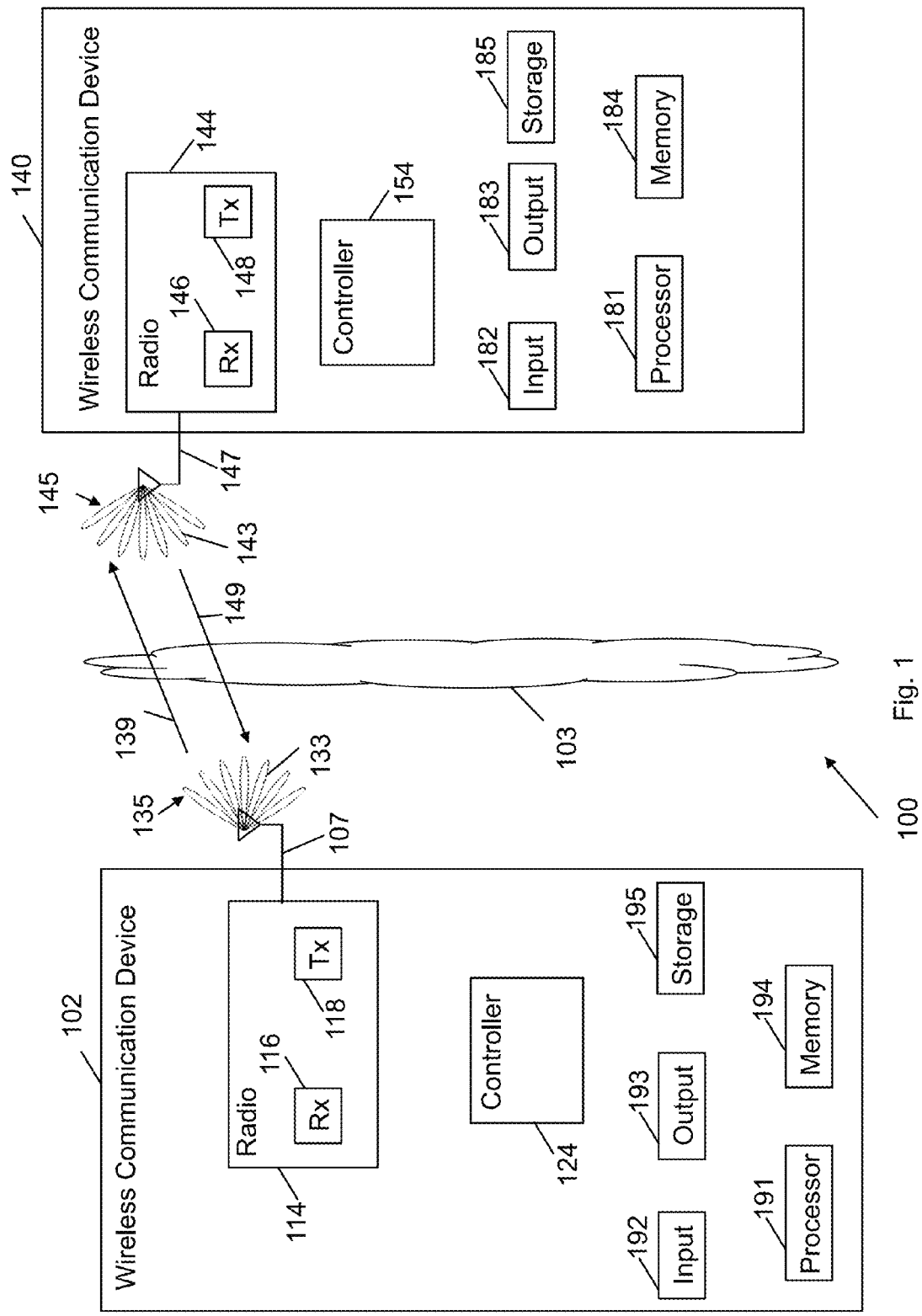
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY)*

Specifications, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); 802.11x) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "access point" (AP), as used herein, may include an entity that contains one station (STA) and provides access to distribution services, via the WM for associated STAs.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, system 100 may include a beamforming initiator (BI) and a beamforming responder (BR) to perform beam training between the BI and the BR. For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments WM 103 may include any other directional channel.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145.

In some demonstrative embodiments, a beam direction of an antenna may be expressed by a direction and a beam width, e.g., an angle, of a beam transmitted by the antenna. In one example, a beam direction may be directed to the north and may have a beam width of 30 degrees.

In some demonstrative embodiments, the plurality of beam directions 135 and/or 145 may include relatively narrow beams, e.g., beams having a beam width between 1-10 degrees.

In one example, the plurality of beam directions 135 and/or 145 may include relatively narrow beams, for example, if antennas 107 and/or 147 use the mmWave wireless communication band to communicate between devices 102 and 140.

In some demonstrative embodiments, a number of the plurality of beam directions 135 and/or 145 may be relatively large, for example, if the plurality of beam directions 135 and/or 145 include relatively narrow beams.

In one example, the plurality of beam directions 135 or 145 may include 360 beam directions, for example, if a beam width of a beam direction of the plurality of beam directions 135 or 145 is one degree.

In some demonstrative embodiments, devices 102 and/or 140 may select a pair of beams including a first beam direction of the plurality of beam directions 135 and a second beam direction of the plurality of beam directions 145 to communicate between devices 102 and 140 via a mmWave wireless communication link.

In some demonstrative embodiments, devices 102 and/or 140 may require a relatively long period of time to select the pair of beams to communicate between devices 102 and 140, for example, if devices 102 and/or 140 evaluate and/or test all possible combinations of pairs between the plurality of beam directions 135 and 145.

In one example, device 102 and/or 140 may evaluate 360 beam directions and device 140 may evaluate 360 beam directions, e.g., a total of 720 evaluations, for example, if a beamwidth of each beam direction of the plurality of beam directions 135 and/or 145 is one degree, and devices 102 and/or 140 evaluate all possible combinations of pairs in a two dimensional (2D) plane, e.g., only in the horizontal plane.

In another example, device 102 and/or 140 may perform 259200 evaluations, for example, if device 102 and/or 140 evaluate all possible combinations of pairs in a three dimensional (3D) plane, e.g., 360 beam directions in the horizontal plane, and 360 beam direction in the vertical plane.

Some demonstrative embodiments may enable to select the pair of beams to communicate between devices 102 and 140 at a relatively reduced period of time, e.g., as described below.

Some demonstrative embodiments may enable to select the pair of beams to communicate between devices 102 and 140, for example, without evaluating all possible combinations between the plurality of beam directions 135 and 145, for example, by evaluating a reduced number of possible combinations between the plurality of beam directions 135 and 145, e.g., as described below.

Some demonstrative embodiments may enable devices 102 and/or 140 to stop to evaluate the possible combinations, for example, when a suitable, e.g., a "good enough", pair of the first beam direction of the plurality of beam directions 135 and the second beam direction of the plurality of beam directions 145 is detected by devices 102 and 140, e.g., as described below.

In some demonstrative embodiments, the suitable pair may include a pair of the first beam direction of the plurality of beam directions 135 and the second beam direction of the plurality of beam directions 145, which may enable communication between devices 102 and/or 140 in an acceptable range and/or an acceptable data rate, for example, according to one or more requirements of device 102 and/or device 140.

Some demonstrative embodiments may enable a first device of devices 102 and 140 to send feedback to a second device of devices 102 and 140, for example, after each evaluation of a beam direction of the second device.

In some demonstrative embodiments, the feedback may indicate a beam direction, for example, if the beam direction is detected by the first device to be a suitable beam direction, e.g., as described below.

In some demonstrative embodiments, devices 102 and/or 140 may include a controller to repeat a beamforming training sequence including a transmit (Tx) mode and a receive (Rx) mode. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In some demonstrative embodiments, controller 124 may repeat the beamforming training sequence including the Tx mode followed by the Rx mode, for example, if device 102 performs the functionality of the BI.

In some demonstrative embodiments, controller 124 may repeat the beamforming training sequence a plurality of times.

In some demonstrative embodiments, controller 124 may terminate the beamforming training sequence, for example, when a suitable pair of the first beam direction of the plurality of beam directions 135 and the second beam direction of the plurality of beam directions 145 is detected, e.g., as described below.

In some demonstrative embodiments, transmitter 118 may transmit a directional training signal 139 to device 140, e.g., at the Tx mode of each repetition of the beamforming training sequence.

In some demonstrative embodiments, training signal 139 may include a millimeter-wave training signal.

In some demonstrative embodiments, transmitter 118 may change a beam direction of the directional training signal 139 between repetitions of the beamforming training sequence. For example, transmitter 118 may change from a first beam direction of the plurality of beam directions 135 to a second, e.g., different, beam direction of the plurality of beam directions 135, e.g., every repetition of the beamforming training sequence.

In some demonstrative embodiments, controller 124 may determine a prioritized order of the plurality of beam directions 135, e.g., as described below.

In some demonstrative embodiments, controller 124 may change the beam direction of directional training signal 139 according to the prioritized order.

In some demonstrative embodiments, the plurality of beam directions 135 may belong to a plurality of sectors.

In some demonstrative embodiments, controller 124 may prioritize a beam direction of a sector, based on a number of associated devices in the sector.

For example, a first beam direction of the plurality of beam directions 135 may belong to a first sector, which may be associated with a first number of devices, and a second beam direction of the plurality of beam directions 135 may belong to a second sector, which may be associated with a second number of devices. According to this example, controller 124 may use the first beam direction to transmit directional training signal 139, e.g., before using the second beam direction, for example, if the first number of devices is greater than the second number of devices.

In some demonstrative embodiments, receiver 116 may be at an omnidirectional Rx state, e.g., at the Rx mode of each repetition of the beamforming training sequence. For example, antenna 107 may be at an omnidirectional Rx state.

In some demonstrative embodiments, controller 154 may repeat the beamforming sequence including the Rx mode followed by the Tx mode, for example, if device 140 performs the functionality of the BR.

In other embodiments, controller 154 may perform the functionality of controller 124, and vice versa. According to these embodiments, the order of the RX mode and the Tx mode within a beamforming sequence may be switched.

In some demonstrative embodiments, controller 154 may repeat the beamforming training sequence a plurality of times.

In some demonstrative embodiments, controller 154 may terminate the beamforming training sequence, for example, when the suitable pair of the first beam direction of the plurality of beam directions 135 and the second beam direction of the plurality of beam directions 145 is detected, e.g., as described below.

In some demonstrative embodiments, receiver 146 may be at an omnidirectional Rx state, e.g., at the Rx mode of each repetition of the beamforming training sequence. For example, antenna 147 may be at an omnidirectional Rx state.

In some demonstrative embodiments, transmitter 148 may transmit a directional training signal 149 to device 102, e.g., at the Tx mode of each repetition of the beamforming training sequence.

In some demonstrative embodiments, training signal 149 may include a millimeter-wave Tx training signal.

In some demonstrative embodiments, transmitter 148 may change a beam direction of the directional training signal 149 between repetitions of the beamforming training sequence. For example, transmitter 148 may change from a first beam direction of beam directions 145 to a second, e.g., different, beam direction of beam directions 145, e.g., every repetition of the beamforming training sequence.

In some demonstrative embodiments, controller 154 may determine a prioritized order of the plurality of beam directions 145, e.g., as described below.

In some demonstrative embodiments, controller 154 may change the beam direction of directional training signal 149 according to the prioritized order.

In some demonstrative embodiments, the plurality of beam directions 145 may belong to a plurality of sectors.

In some demonstrative embodiments, controller 154 may prioritize a beam direction of a sector, based on a number of associated devices in the sector.

For example, a first beam direction of the plurality of the plurality of beam directions 145 may belong to a first sector, which may be associated with a first number of devices, and a second beam direction of the plurality of beam directions 145 may belong to a second sector, which may be associated with a second number of devices. According to this example, controller 154 may use the first beam direction to transmit directional training signal 149, e.g., before using the second beam direction, for example, if the first number of devices is greater than the second number of devices.

In some demonstrative embodiments, receiver 116 may successfully receive training signal 149 from device 140. For example, receiver 116 may successfully receive training signal 149, e.g., if the beam direction of training signal 149 is directed towards device 102.

In some demonstrative embodiments, transmitter 118 may transmit directional training signal 139 including a beam indication to indicate a beam direction of training signal 149, e.g., subsequent to the successful receipt of training signal 149 from device 140.

In one example, transmitter 118 may transmit directional training signal 139 including the beam indication to indicate a beam direction 143 of beam directions 145, for example, if training signal 149 is transmitted via beam direction 143 and successfully received by receiver 116.

In some demonstrative embodiments, receiver 146 may successfully receive training signal 139 from device 102. For example, receiver 146 may successfully receive training signal 139, e.g., if the beam direction of training signal 139 is directed towards device 140.

In some demonstrative embodiments, transmitter 148 may transmit directional training signal 149 including a beam indication to indicate a beam direction of training signal 139, e.g., subsequent to the successful receipt of training signal 139 from device 102.

In one example, transmitter 148 may transmit directional training signal 149 including the beam indication to indicate a beam direction 133 of beam directions 135, for example, if training signal 139 is transmitted via beam direction 133 and successfully received by receiver 146.

In some demonstrative embodiments, receiver 116 may receive from device 140 training signal 149 including a detected beam direction of antennas 107. For example, receiver 118 may receive training signal 139 including the detected beam indication to indicate beam direction 133.

In some demonstrative embodiments, upon receipt of training signal 149 including the detected beam indication, transmitter 118 may transmit directional training signal 149 in the detected beam direction, e.g., during subsequent repetitions of the beamforming training sequence.

For example, during subsequent repetitions of the beamforming training sequence, transmitter 118 may transmit directional training signal 139 in beam direction 133, e.g., and not in other beam directions of beam directions 135, for example, if receiver 116 receives training signal 149 including the beam indication indicating beam direction 133.

In some demonstrative embodiments, receiver 146 may receive from device 102 training signal 139 including a detected beam indication. For example, receiver 148 may receive training signal 139 including the beam indication to indicate beam direction 143.

In some demonstrative embodiments, upon receipt of training signal 139 including the detected beam indication, transmitter 148 may transmit directional training signal 149 in the detected beam direction, e.g., during subsequent repetitions of the beamforming training sequence.

For example, during subsequent repetitions of the beamforming training sequence, transmitter 148 may transmit directional training signal 149 in beam direction 143, e.g., and not in other beam directions of beam directions 145, for example, if receiver 146 receives training signal 139 including the beam indication indicating beam direction 143.

In some demonstrative embodiments, controller 124 may terminate the beamforming training sequence, and device 102 may communicate with device 140 via the detected beam direction of the plurality of beam directions 135 and the detected beam direction of the plurality of beam directions 145, for example, if receiver 116 receives from device 140 training signal 149 including the detected beam direction of beam directions 135, and transmitter 118 has previously transmitted to device 140 training signal 139 including the beam direction of beam directions 145.

For example, controller 124 may terminate the beamforming training sequence, and device 102 may communicate with device 140 via beam direction 133 and beam direction 143, for example, if receiver 116 receives training signal 149 including beam direction 133, and transmitter 118 has previously transmitted to device 140 training signal 139 including the beam direction 143.

In some demonstrative embodiments, controller 154 may terminate the beamforming training sequence, and device 140 may communicate with device 102 via the detected beam direction of the plurality of beam directions 145 and the detected beam direction of the plurality of beam directions 135, for example, if receiver 146 receives from device 102 training signal 139 including the detected beam direction of beam directions 145, and transmitter 148 has previously transmitted to device 102 training signal 139 including the beam direction of beam directions 135.

For example, controller 154 may terminate the beamforming training sequence, and device 140 may communicate with device 102 via beam direction 143 and beam direction 133, for example, if receiver 146 receives training signal 139 including beam direction 143 and transmitter 148 has previously transmitted to device 102 training signal 149 including the beam direction 133.

In some demonstrative embodiments, controllers 124 and/or 154 may repeat the beamforming training sequence during a coarse beam training session.

For example, controllers 124 and/or 154 may utilize the beamforming training sequence, e.g., as described above, to find a coarse beam direction, e.g., covering a plurality of fine beam directions, of transmitters 118 and/or 148.

In some demonstrative embodiments, controllers 124 and/or 154 may repeat the beamforming training sequence during a fine beam training session.

For example, controllers 124 and/or 154 may utilize the beamforming training sequence, e.g., as described above, to find a fine beam direction of transmitters 118 and/or 148, for example, after finding the coarse beam direction of transmitters 118 and/or 148 using the beamforming training sequence, e.g., as described above.

In some demonstrative embodiments, using the beamforming training sequence, e.g., as described above, may enable device 102 to switch between the TX mode and the RX mode to receive the detected beam direction, e.g., via directional training signal 149, during every beamforming training sequence, and to terminate the beamforming training sequence, e.g., once the detected beam direction is received.

In some demonstrative embodiments, using the beamforming training sequence, e.g., as described above, may enable device 102 to reduce time to perform the beamforming training, for example, by terminating the beamforming training sequence once the detected beam direction is received, e.g., without switching between all of the plurality of beam directions 135.

Figure 2:
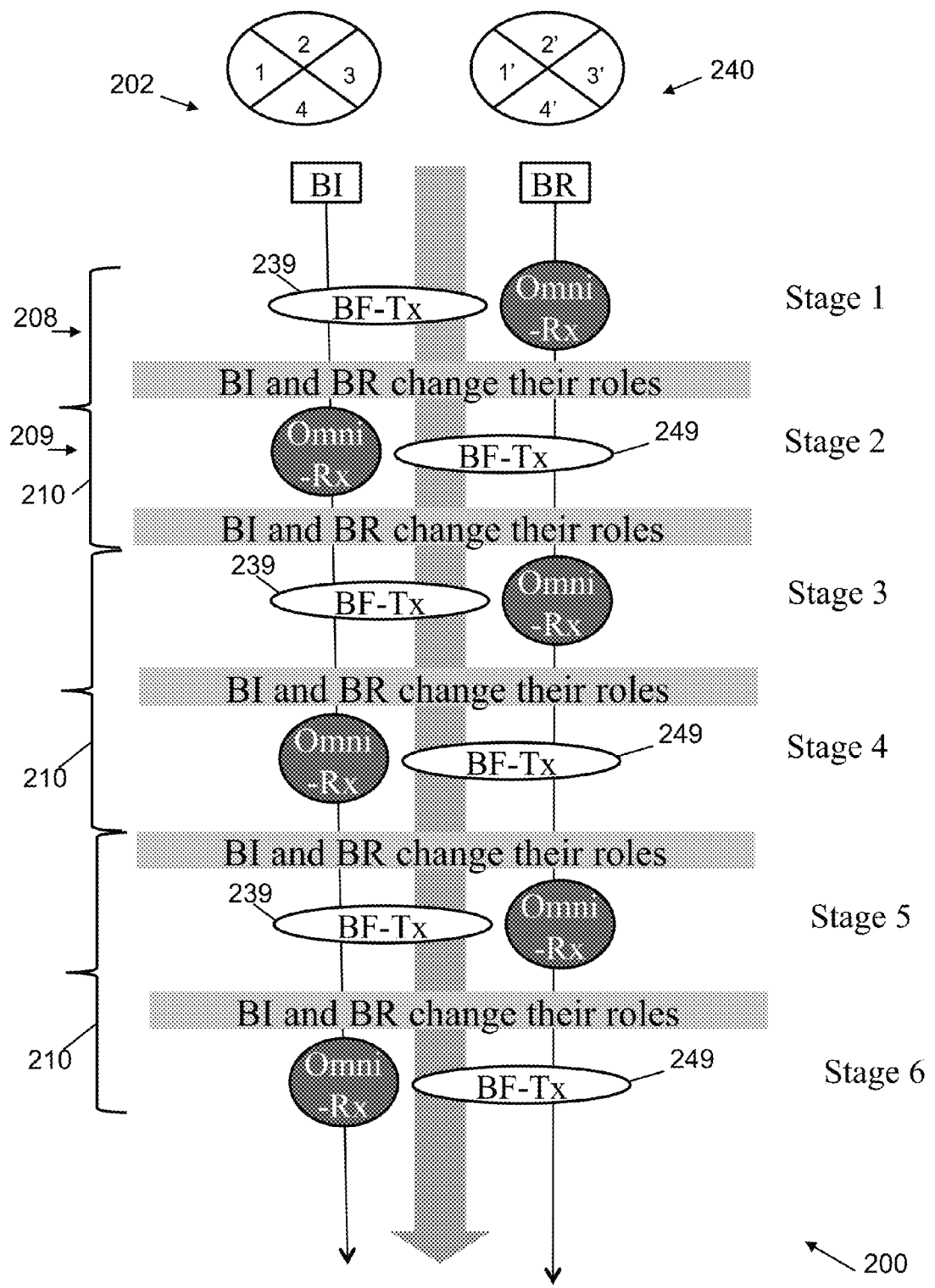
FIG. 2 is a schematic illustration of a sequence diagram of operations and interactions between a beamforming initiator (BI) and a beamforming responder (BR) during a beam training session, in accordance with some demonstrative embodiments.

Reference is made to FIG. 2, which schematically illustrates a sequence diagram 200 of operations and interactions between a beamforming initiator (BI) 202 and a beamforming responder (BR) 240 during a beam training session, in accordance with some demonstrative embodiments. For example, BI 202 may perform the functionality of device 102 (FIG. 1), and/or BR 240 may perform the functionality of device 140 (FIG. 1).

As shown in FIG. 2, BI 202 may have four beam directions, denoted 1-4, and/or BR 240 may have four beam directions, denoted 1'-4'.

In some demonstrative embodiments, BI 202 and/or BR 204 may include any other number of beam directions, for example, 360 beam directions, e.g., as described above.

In some demonstrative embodiments, BI 202 and BR 204 may repeat a beamforming training sequence 210 a plurality of times.

As shown in FIG. 2, BI 202 may repeat beamforming training sequence 210 including a Tx mode followed by an Rx mode, and/or BR 240 may repeat beamforming training sequence 210 including the Tx mode followed by the Rx mode.

As shown in FIG. 2, beamforming training sequence 210 may include two subsequent parts, e.g., a first part 208 followed by a second part 209.

As shown in FIG. 2, at the first part 208 of beamforming training sequence 210, BI 202 may be at the Tx mode, and may transmit a directional training signal 239 to BR 240, which may be at the Rx mode. For example, directional training signal 239 may perform the functionality of directional training signal 139 (FIG. 1).

As shown in FIG. 2, at the second part 209 of beamforming training sequence 210, BR 240 may be at the Tx mode, and may transmit a directional training signal 249 to BI 202, which may be at the Rx mode. For example, directional training signal 249 may perform the functionality of directional training signal 149 (FIG. 1).

As shown in FIG. 2, the beam training session may include a total of six stages, denoted "Stage 1-Stage 6". Each stage of the six stages may include a time slot along sequence diagram 200.

As shown in FIG. 2, in each stage of the 6 stages BI 202 and BR 240 may switch the functionality between the Tx mode and the Rx mode.

As shown in FIG. 2, during Stage 1, BI 202 may be at the Tx mode and BR 240 may be at the Rx mode.

In some demonstrative embodiments, during Stage 1, BI 202 may transmit to BR 240 a directional training signal 239 via beam direction 1.

In some demonstrative embodiments, the directional training signal 239 of Stage 1 may not include an indication of a detected beam direction of BR 240, for example, since BI 202 did not yet receive directional training signal 249 from BR 240.

In some demonstrative embodiments, BR 240 may not receive the directional training signal 239 of Stage 1, for example, since the directional training signal 239 of Stage 1 is transmitted via beam direction 1, which may not be directed towards BR 240.

As shown in FIG. 2, during Stage 2, BI 202 and BR 240 may switch the functionality between BI 202 and BR 240, e.g., BI 202 may be at the Rx mode, and BR 240 may be at the Tx mode.

In some demonstrative embodiments, BR 240 may transmit to BI 202 directional training signal 249 via beam direction 1'.

In some demonstrative embodiments, the directional training signal 249 of stage 2 may not include an indication of a detected beam direction of BI 202, for example, since BR 240 did not yet receive training signal 239 from BR 240.

In some demonstrative embodiments, BI 202 may receive the directional training signal 249 of Stage 2, for example, since the directional training signal 242 of Stage 2 is transmitted via beam direction 1', which may be directed towards BI 202.

In some demonstrative embodiments, BI 202 may verify that beam direction 1' is suitable to communicate with BR 240, e.g., based on a data rate of the directional training signal 249 of Stage 2, a signal to noise ratio (SNR) of directional training signal 249, and/or any other criteria or parameter.

In some demonstrative embodiments, upon the successful receipt of the directional training signal 249 of Stage 2, BI 202 may feedback to BR 240 that beam direction 1' is suitable to communicate with BI 202.

As shown in FIG. 2, during Stage 3, BI 202 and BR 240 may switch the functionality between BI 202 and BR 240, e.g., BI 202 may be at the Tx mode and BR 240 may be at the Rx mode.

In some demonstrative embodiments, during Stage 3, BI 202 may transmit to BR 240 directional training signal 239 via beam direction 2.

In some demonstrative embodiments, the directional training signal 239 of Stage 3 may include an indication of beam direction 1' of BR 240, for example, since BI 202 received training signal 249 from beam direction 1' of BR 240.

In some demonstrative embodiments, BR 240 may not receive the directional training signal 239 of Stage 3, for example, since the directional training signal 239 of Stage 3 is transmitted via beam direction 2, which may not be directed towards BR 240.

As shown in FIG. 2, during Stage 4, BI 202 and BR 240 may switch the functionality between BI 202 and BR 240, e.g., BI 202 may be at the Rx mode and BR 240 may be at the Tx mode.

In some demonstrative embodiments, during Stage 4, BR 240 may transmit to BI 202 directional training signal 249 via beam direction 2'.

In some demonstrative embodiments, the directional training signal 249 of Stage 4 may not include an indication of a detected beam direction of BI 202, for example, since BR 240 did not yet receive training signal 239 from BR 240.

In some demonstrative embodiments, BI 202 may not receive the directional training signal 249 of Stage 4, for example, since the directional training signal 249 of Stage 4 is transmitted via beam direction 2', which may not be directed towards BI 202.

As shown in FIG. 2, during Stage 5, BI 202 and BR 240 may switch the functionality between BI 202 and BR 240, e.g., BI 202 may be at the Tx mode and BR 240 may be at the Rx mode.

In some demonstrative embodiments, during Stage 5, BI 202 may transmit to BR 240 directional training signal 239 via beam direction 3.

In some demonstrative embodiments, the directional training signal 239 of Stage 5 may include an indication of beam direction 1' of BR 240, for example, since BI 202 detected beam direction 1' of BR 240.

In some demonstrative embodiments, BR 240 may receive the directional training signal 239 of Stage 5, for example, since the directional training signal 239 of Stage 5 is transmitted via beam direction 3, which may be directed towards BI 202.

In some demonstrative embodiments, BR 240 may verify that beam direction 3 is suitable to communicate with BR 240, e.g., based on a data rate of the directional training signal 239 of Stage 5, a signal to noise ratio (SNR) of directional training signal 239, and/or any other criteria or parameter.

In some demonstrative embodiments, upon the successful receipt of the directional training signal 239 of Stage 5, BR 240 may feedback to BI 202 that beam direction 3 is suitable to communicate with BR 240.

In some demonstrative embodiments, BR 240 may receive the indication of beam direction 1' in training signal 239, and may use beam direction 1' to transmit directional training signal 249 during subsequent repetitions of beamforming training sequence 210, e.g., as described below.

As shown in FIG. 2, during Stage 6, BI 202 and BR 240 may switch the functionality between BI 202 and BR 240, e.g., BI 202 may be at the Rx mode and BR 240 may be at the Tx mode.

In some demonstrative embodiments, during Stage 6, BR 240 may transmit to BI 202 directional training signal 249 via beam direction 1', for example, since directional training signal 239 indicates beam direction 1'.

In some demonstrative embodiments, the directional training signal 249 of Stage 6 may include an indication of beam direction 3 of BI 202, for example, since BR 240 detected beam direction 3 of BI 202.

In some demonstrative embodiments, BI 202 may receive the directional training signal 249 of Stage 6, for example, since directional training signal 249 is transmitted via beam direction 1', which was detected by BI 202.

In some demonstrative embodiments, BI 202 may receive the indication of beam direction 3 in the training signal 249 of Stage 6.

In some demonstrative embodiments, BI 202 may terminate beamforming training sequence 210, for example, after BI 202 receives the indication of beam direction 3, and BR 240 receives the indication of beam direction 1', e.g., as described above.

In some demonstrative embodiments, BI 202 and BR 240 may communicate data between BI 202 and BR 240 via beam direction 1' and beam direction 3.

In some demonstrative embodiments, using beamforming training sequence 210 may enable to terminate the beam training session, for example, without testing all beam directions of BI 202 and/or BR 240.

Figure 3:
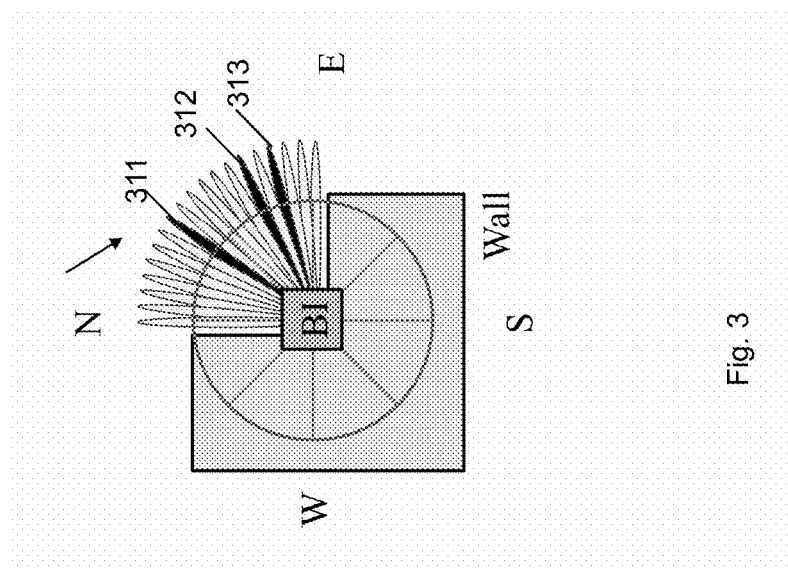
FIG. 3 is a schematic illustration of a plurality of beam directions of a wireless communication device, in accordance with some demonstrative embodiments.

Reference is made to FIG. 3, which schematically illustrates a plurality of beam directions 325 of a wireless communication device 302, in accordance with some demonstrative embodiments. For example, wireless communication device 302 may perform the functionality of device 102 or device 140 (FIG. 1).

In some demonstrative embodiments, device 302 may determine a prioritized order of the plurality of beam directions 325, and may change a beam direction of a directional training signal, e.g., training signal 139 or 149 (FIG. 1), transmitted from device 302, according to the prioritized order.

In some demonstrative embodiments, device 302 may utilize the prioritized order of the plurality of beam directions 325, for example, if device 302 is static.

As shown in FIG. 3, device 302 may be located at a southwest corner of a room, e.g., adjacent to the walls of the room.

In some demonstrative embodiments, the directional training signal may not be able to go through the walls. Accordingly, beam directions of the plurality of beam directions 325, which are directed towards the West and the South, may not be effective.

In some demonstrative embodiments, device 302 may select not to evaluate the beam direction of the directional training signal towards the west and the south directions.

As shown in FIG. 3, beam directions of beams direction 325, which directed towards the northeast sector of device 302, may not be blocked by the walls of the MOM.

In some demonstrative embodiments, the beam directions may belong to a plurality of sectors, and device 302 may prioritize a beam direction of a sector based on a number of associated devices in the sector.

For example, device 302 may change the beam direction of the training signal towards beam directions 311, 312 and/or 313, for example, if beam directions 311, 312, and/or 313 belong to a first sector, a second sector and/or a third sector, respectively, and one or more devices are associated with the first, second and/or a third sectors, while other sectors do not have any device associated.

Figure 4:
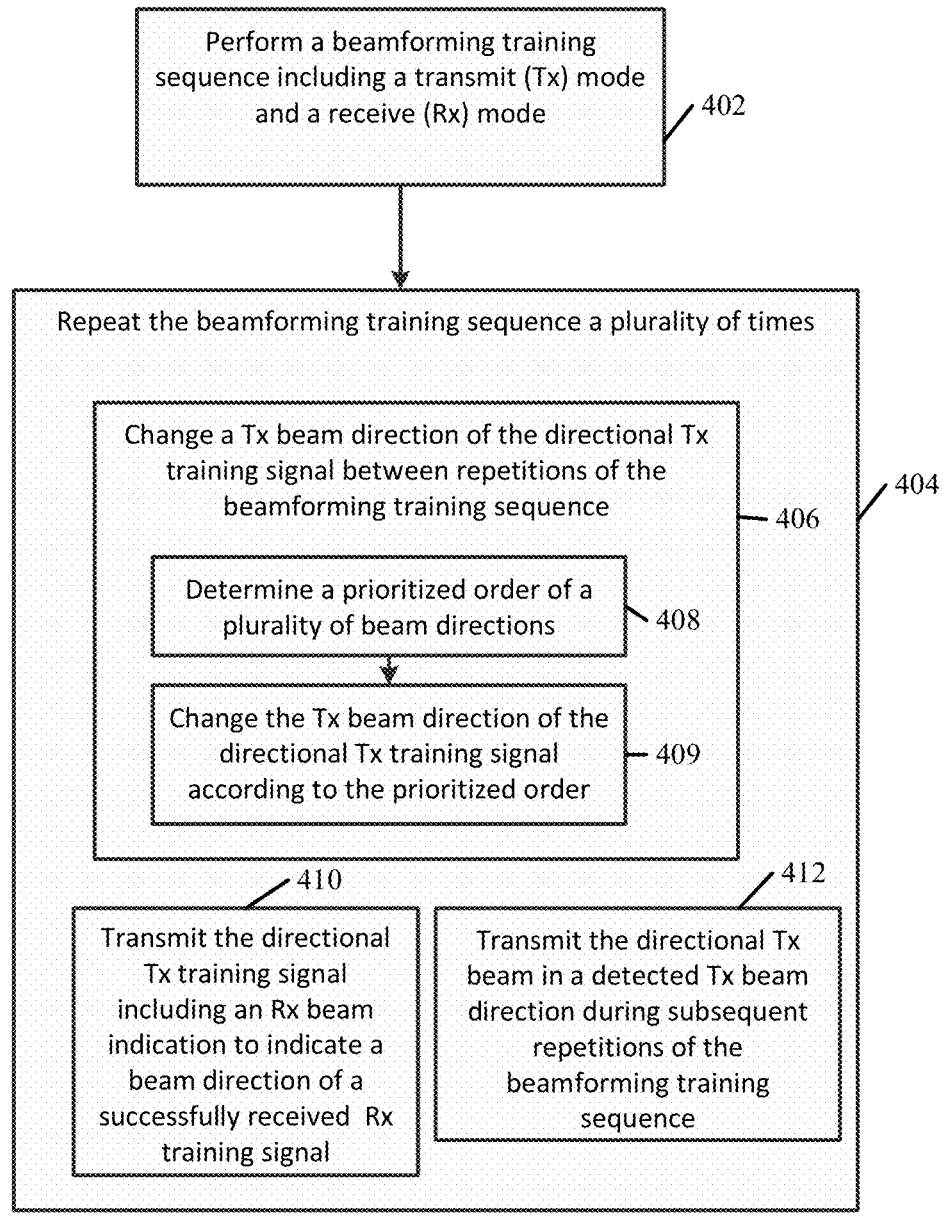
FIG. 4 is a flow-chart illustration of a method of beamforming training, in accordance with some demonstrative embodiments.

FIG. 4 is a flow-chart illustration of a method of beamforming training, in accordance with some demonstrative embodiments. One or more operations of the method of FIG. 4 may be performed, for example, by one or more elements of a system, e.g., system 100 (FIG. 1), a wireless communication device, e.g., device 102 (FIG. 1) and/or device 140 (FIG. 1), a transmitter, e.g., transmitter 118 and/or transmitter 148 (FIG. 1); a receiver, e.g., receiver 116 and/or receiver 146 (FIG. 1), and/or a controller, e.g., controller 124 and/or controller 154 (FIG. 1).

As indicated at block 402, the method may include performing a beamforming training sequence at a first wireless communication device. The beamforming training sequence may include a Tx mode and an Rx mode, the Tx mode including transmitting a directional Tx training signal to a second wireless communication device, and the Rx mode including operating at an omnidirectional Rx state. For example, controller 124 and/or controller 154 (FIG. 1) may perform the beamforming training sequence, e.g., as described above.

As indicated at block 404, the method may include repeating the beamforming training sequence a plurality of times. For example, controller 124 and/or controller 154 (FIG. 1) may repeat the beamforming training sequence a plurality of times, e.g., as described above.

As indicated at block 406, repeating the beamforming training sequence may include changing a Tx beam direction of the directional Tx training signal between repetitions of the beamforming training sequence. For example, controller 124 (FIG. 1) may change the beam direction of directional training signal 139 (FIG. 1) between the repetitions of the beamforming training sequence; and/or controller 154 (FIG. 1) may change the beam direction of directional training signal 149 (FIG. 1) between the repetitions of the beamforming training sequence, e.g., as described above.

As indicated at block 408, changing the Tx beam direction of the directional Tx training signal may include determining a prioritized order of a plurality of beam directions. For example, controller 124 (FIG. 1) may determine the prioritized order of the plurality of beam directions 135 (FIG. 1); and/or controller 154 (FIG. 1) may determine the prioritized order of the plurality of beam directions 145 (FIG. 1), e.g., as described above.

As indicated at block 409, changing the Tx beam direction of the directional Tx training signal may include changing the Tx beam direction of the directional Tx training signal according to the prioritized order. For example, controller 124 (FIG. 1) may change the Tx beam direction of directional training signal 139 (FIG. 1) according to the prioritized order; and/or controller 154 (FIG. 1) may change the Tx beam direction of directional training signal 149 (FIG. 1) according to the prioritized order e.g., as described above.

As indicated at block 410, repeating the beamforming training sequence may include upon successful receipt of a directional Rx training signal from the second wireless communication device, transmitting the directional Tx training signal including an Rx beam indication to indicate a beam direction of the Rx training signal. For example, transmitter 118 (FIG. 1) may transmit directional training signal 139 (FIG. 1) including beam direction 143 (FIG. 1), for example, upon successful receipt of directional training signal 149 (FIG. 1) from the device 140 (FIG. 1); and/or transmitter 148 (FIG. 1) may transmit directional training signal 149 (FIG. 1) including beam direction 133 (FIG. 1), for example, upon successful receipt of directional training signal 139 (FIG. 1) from the device 102 (FIG. 1), e.g., as described above.

As indicated at block 412, repeating the beamforming training sequence may include, upon receipt of the Rx training signal including a Tx beam indication of a detected Tx beam direction of the transmitter, transmitting the directional Tx beam in the detected Tx beam direction during subsequent repetitions of the beamforming training sequence. For example, transmitter 118 (FIG. 1) may transmit directional training signal 139 (FIG. 1) in beam direction 133 (FIG. 1) during the subsequent repetitions of the beamforming training sequence, for example, upon receipt of directional training signal 149 (FIG. 1) including the Tx beam indication of beam direction 133 (FIG. 1); and/or transmitter 148 (FIG. 1) may transmit directional training signal 149 (FIG. 1) in beam direction 143 (FIG. 1) during the subsequent repetitions of the beamforming training sequence, for example, upon receipt of directional training signal 139 (FIG. 1) including the Tx beam indication of beam direction 143 (FIG. 1), e.g., as described above.

Figure 5:
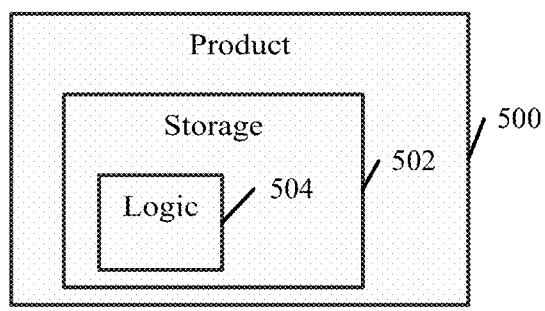
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a transmitter; a receiver; and a controller to repeat a beamforming training sequence including a transmit (Tx) mode and a receive (Rx) mode, at the Tx mode the transmitter is to transmit a directional Tx training signal to a wireless communication device, and at the Rx mode the receiver is to be at an omnidirectional Rx state, wherein subsequent to successful receipt of a directional Rx training signal from the wireless communication device at the receiver, the transmitter is to transmit the directional Tx training signal including an Rx beam indication to indicate a beam direction of the Rx training signal.

Example 2 includes the subject matter of Example 1, and optionally, wherein the transmitter is to change a Tx beam direction of the directional Tx training signal between repetitions of the beamforming training sequence.

Example 3 includes the subject matter of Example 2, and optionally, wherein the controller is to determine a prioritized order of a plurality of beam directions, and to change the Tx beam direction of the directional Tx training signal according to the prioritized order.

Example 4 includes the subject matter of Example 3, and optionally, wherein the plurality of beam directions belong to a plurality of sectors, the controller is to prioritize a beam direction of a sector, based on a number of associated devices in the sector.

Example 5 includes the subject matter of any one of Examples 1-4, and optionally, wherein upon receipt of the Rx training signal including a Tx beam indication of a detected Tx beam direction of the transmitter, the transmitter is to transmit the directional Tx beam in the detected Tx beam direction during subsequent repetitions of the beamforming training sequence.

Example 6 includes the subject matter of any one of Examples 1-5, and optionally, wherein the controller is to repeat the beamforming training sequence during a coarse beam training session.

Example 7 includes the subject matter of any one of Examples 1-6, and optionally, wherein the controller is to repeat the beamforming training sequence during a fine beam training session.

Example 8 includes the subject matter of any one of Examples 1-7 including a beamforming initiator (BI).

Example 9 includes the subject matter of Example 8, and optionally, wherein the beamforming training sequence includes the Tx mode followed by the Rx mode.

Example 10 includes the subject matter of any one of Examples 1-7 including a beamforming responder (BR).

Example 11 includes the subject matter of Example 10, and optionally, wherein the beamforming training sequence includes the Rx mode followed by the Tx mode.

Example 12 includes the subject matter of any one of Examples 1-11, and optionally, wherein the directional Tx training signal comprises a millimeter-wave Tx training signal.

Example 13 includes a first wireless communication device comprising at least one directional antenna; a processor; a memory; a transmitter; a receiver; and a controller to repeat a beamforming training sequence including a transmit (Tx) mode and a receive (Rx) mode, at the Tx mode the transmitter is to transmit via the directional antenna a directional Tx training signal to a second wireless communication device, and at the Rx mode the receiver is to be at an omnidirectional Rx state, wherein subsequent to successful receipt of a directional Rx training signal from the second wireless communication device at the receiver, the transmitter is to transmit the directional Tx training signal including an Rx beam indication to indicate a beam direction of the Rx training signal.

Example 14 includes the subject matter of Example 13, and optionally, wherein the transmitter is to change a Tx beam direction of the directional Tx training signal between repetitions of the beamforming training sequence.

Example 15 includes the subject matter of Example 14, and optionally, wherein the controller is to determine a prioritized order of a plurality of beam directions, and to change the Tx beam direction of the directional Tx training signal according to the prioritized order.

Example 16 includes the subject matter of Example 15, and optionally, wherein the plurality of beam directions belong to a plurality of sectors, the controller is to prioritize a beam direction of a sector, based on a number of associated devices in the sector.

Example 17 includes the subject matter of any one of Examples 13-16, and optionally, wherein upon receipt of the Rx training signal including a Tx beam indication of a detected Tx beam direction of the transmitter, the transmitter is to transmit the directional Tx beam in the detected Tx beam direction during subsequent repetitions of the beamforming training sequence.

Example 18 includes the subject matter of any one of Examples 13-17, and optionally, wherein the controller is to repeat the beamforming training sequence during a coarse beam training session.

Example 19 includes the subject matter of any one of Examples 13-18, and optionally, wherein the controller is to repeat the beamforming training sequence during a fine beam training session.

Example 20 includes the subject matter of any one of Examples 13-19 including a beamforming initiator (BI).

Example 21 includes the subject matter of Example 20, and optionally, wherein the beamforming training sequence includes the Tx mode followed by the Rx mode.

Example 22 includes the subject matter of any one of Examples 13-19 including a beamforming responder (BR).

Example 23 includes the subject matter of Example 22, and optionally, wherein the beamforming training sequence includes the Rx mode followed by the Tx mode.

Example 24 includes the subject matter of any one of Examples 13-23, and optionally, wherein the directional Tx training signal comprises a millimeter-wave Tx training signal Example 25 includes a method of beamforming training at a first wireless communication device, the method comprising performing a beamforming training sequence including a transmit (Tx) mode and a receive (Rx) mode, the Tx mode including transmitting a directional Tx training signal to a second wireless communication device, and the Rx mode including operating at an omnidirectional Rx state; and repeating the beamforming training sequence a plurality of times, wherein, repeating the beamforming training sequence comprises, upon successful receipt of a directional Rx training signal from the second wireless communication device, transmitting the directional Tx training signal including an Rx beam indication to indicate a beam direction of the Rx training signal.

Example 26 includes the subject matter of Example 25, and optionally, comprising changing a Tx beam direction of the directional Tx training signal between repetitions of the beamforming training sequence.

Example 27 includes the subject matter of Example 26, and optionally, comprising determining a prioritized order of a plurality of beam directions, and changing the Tx beam direction of the directional Tx training signal according to the prioritized order.

Example 28 includes the subject matter of Example 27, and optionally, wherein the plurality of beam directions belong to a plurality of sectors, the method comprising prioritizing a beam direction of a sector, based on a number of associated devices in the sector.

Example 29 includes the subject matter of any one of Examples 25-28, and optionally, comprising, upon receipt of the Rx training signal including a Tx beam indication of a detected Tx beam direction of the transmitter, transmitting the directional Tx beam in the detected Tx beam direction during subsequent repetitions of the beamforming training sequence.

Example 30 includes the subject matter of any one of Examples 25-29, and optionally, comprising repeating the beamforming training sequence during a coarse beam training session.

Example 31 includes the subject matter of any one of Examples 25-30, and optionally, comprising repeating the beamforming training sequence during a fine beam training session.

Example 32 includes the subject matter of any one of Examples 25-31, and optionally, wherein the beamforming training sequence includes the Tx mode followed by the Rx mode.

Example 33 includes the subject matter of any one of Examples 25-31, and optionally, wherein the beamforming training sequence includes the Rx mode followed by the Tx mode.

Example 34 includes the subject matter of any one of Examples 25-33, and optionally, wherein the directional Tx training signal comprises a millimeter-wave Tx training signal.

Example 35 includes a product including one or more tangible computer-readable non-transitory storage media comprising computer-executable instructions operable to, when executed by at least one computer processor, enable the at least one computer processor to implement a method of beamforming training at a first wireless communication device, the method comprising performing a beamforming training sequence including a transmit (Tx) mode and a receive (Rx) mode, the Tx mode including transmitting a directional Tx training signal to a second wireless communication device, and the Rx mode including operating at an omnidirectional Rx state; and repeating the beamforming training sequence a plurality of times, wherein, repeating the beamforming training sequence comprises, upon successful receipt of a directional Rx training signal from the second wireless communication device, transmitting the directional Tx training signal including an Rx beam indication to indicate a beam direction of the Rx training signal.

Example 36 includes the subject matter of Example 35, and optionally, wherein the method comprises changing a Tx beam direction of the directional Tx training signal between repetitions of the beamforming training sequence.

Example 37 includes the subject matter of Example 36, and optionally, wherein the method comprises determining a prioritized order of a plurality of beam directions, and changing the Tx beam direction of the directional Tx training signal according to the prioritized order.

Example 38 includes the subject matter of Example 37, and optionally, wherein the plurality of beam directions belong to a plurality of sectors, and wherein the method comprises prioritizing a beam direction of a sector, based on a number of associated devices in the sector.

Example 39 includes the subject matter of any one of Examples 35-38, and optionally, wherein the method comprises, upon receipt of the Rx training signal including a Tx beam indication of a detected Tx beam direction of the transmitter, transmitting the directional Tx beam in the detected Tx beam direction during subsequent repetitions of the beamforming training sequence.

Example 40 includes the subject matter of any one of Examples 35-39, and optionally, wherein the method comprises repeating the beamforming training sequence during a coarse beam training session.

Example 41 includes the subject matter of any one of Examples 35-40, and optionally, wherein the method comprises repeating the beamforming training sequence during a fine beam training session.

Example 42 includes the subject matter of any one of Examples 35-41, and optionally, wherein the beamforming training sequence includes the Tx mode followed by the Rx mode.

Example 43 includes the subject matter of any one of Examples 35-41, and optionally, wherein the beamforming training sequence includes the Rx mode followed by the Tx mode.

Example 44 includes the subject matter of any one of Examples 35-43, and optionally, wherein the directional Tx training signal comprises a millimeter-wave Tx training signal.

Example 45 includes an apparatus comprising means for performing a beamforming training sequence at a first wireless communication device including a transmit (Tx) mode and a receive (Rx) mode, the Tx mode including transmitting a directional Tx training signal to a second wireless communication device, and the Rx mode including operating at an omnidirectional Rx state; and means for repeating the beamforming training sequence a plurality of times, wherein, repeating the beamforming training sequence comprises, upon successful receipt of a directional Rx training signal from the second wireless communication device, transmitting the directional Tx training signal including an Rx beam indication to indicate a beam direction of the Rx training signal.

Example 46 includes the subject matter of Example 45, and optionally, comprising means for changing a Tx beam direction of the directional Tx training signal between repetitions of the beamforming training sequence.

Example 47 includes the subject matter of Example 46, and optionally, comprising means for determining a prioritized order of a plurality of beam directions, and changing the Tx beam direction of the directional Tx training signal according to the prioritized order.

Example 48 includes the subject matter of Example 47, and optionally, wherein the plurality of beam directions belong to a plurality of sectors, the apparatus comprising means for prioritizing a beam direction of a sector, based on a number of associated devices in the sector.

Example 49 includes the subject matter of any one of Examples 45-48, and optionally, comprising means for, upon receipt of the Rx training signal including a Tx beam indication of a detected Tx beam direction of the transmitter, transmitting the directional Tx beam in the detected Tx beam direction during subsequent repetitions of the beamforming training sequence.

Example 50 includes the subject matter of any one of Examples 45-49, and optionally, comprising means for repeating the beamforming training sequence during a coarse beam training session.

Example 51 includes the subject matter of any one of Examples 45-50, and optionally, comprising means for repeating the beamforming training sequence during a fine beam training session.

Example 52 includes the subject matter of any one of Examples 45-51, and optionally, wherein the beamforming training sequence includes the Tx mode followed by the Rx mode.

Example 53 includes the subject matter of any one of Examples 45-51, and optionally, wherein the beamforming training sequence includes the Rx mode followed by the Tx mode.

Example 54 includes the subject matter of any one of Examples 45-53, and optionally, wherein the directional Tx training signal comprises a millimeter-wave Tx training signal.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:
1. An apparatus comprising:
   a transmitter;
   a receiver; and
   a controller to repeat a beamforming training sequence including a transmit (Tx) mode and a receive (Rx) mode, at the Tx mode said controller is to cause said transmitter to transmit a directional Tx training signal to a wireless communication device, and at said Rx mode said controller is to cause said receiver to be at an omnidirectional Rx state,
   wherein the controller is configured to detect successful receipt at said receiver, during an Rx mode of a first beamforming training sequence, of a first directional Rx training signal from the wireless communication device, the controller configured to, when the first directional Rx training signal does not include a Tx beam indication of a detected Tx beam direction of the transmitter, determine an Rx beam indication based on a detected Rx beam direction of the first directional Rx training signal, and to cause said transmitter to transmit the Rx beam indication in the directional Tx training signal during a Tx mode of one or more second beamforming training sequences until successful receipt, at the receiver, of a second directional Rx training signal, which includes the Tx beam indication of the detected Tx beam direction of the transmitter.

2. The apparatus of claim 1, wherein said transmitter is to change a Tx beam direction of the directional Tx training signal between repetitions of the beamforming training sequence.

3. The apparatus of claim 2, wherein said controller is to determine a prioritized order of a plurality of beam directions, and to change the Tx beam direction of the directional Tx training signal according to the prioritized order.

4. The apparatus of claim 3, wherein said plurality of beam directions belong to a plurality of sectors, said controller is to prioritize a beam direction of a sector, based on a number of associated devices in said sector.

5. The apparatus of claim 1, wherein the controller is configured to, when the first directional Rx training signal includes the Tx beam indication of the detected Tx beam direction of said transmitter, cause said transmitter to transmit the directional Tx training signal including the Rx beam indication in the detected Tx beam direction of said transmitter.

6. The apparatus of claim 1, wherein said controller is to repeat said beamforming training sequence during a coarse beam training session.

7. The apparatus of claim 1, wherein said controller is to repeat said beamforming training sequence during a fine beam training session.

8. The apparatus of claim 1 including a beamforming initiator (BI).

9. The apparatus of claim 8, wherein the beamforming training sequence includes said Tx mode followed by said Rx mode.

10. The apparatus of claim 1 including a beamforming responder (BR).

11. The apparatus of claim 10, wherein the beamforming training sequence includes said Rx mode followed by said Tx mode.

12. The apparatus of claim 1, wherein said directional Tx training signal comprises a millimeter-wave Tx training signal.

13. A first wireless communication device comprising:
 at least one directional antenna;
 a processor;
 a memory;
 a transmitter;
 a receiver; and
 a controller to repeat a beamforming training sequence including a transmit (Tx) mode and a receive (Rx) mode, at the Tx mode said controller is to cause said transmitter to transmit via said directional antenna a directional Tx training signal to a second wireless communication device, and at said Rx mode said controller is to cause said receiver to be at an omnidirectional Rx state,
 wherein the controller is configured to detect successful receipt at said receiver, during an Rx mode of a first beamforming training sequence, of a first directional Rx training signal from the second wireless communication device, the controller configured to, when the first directional Rx training signal does not include a Tx beam indication of a detected Tx beam direction of the transmitter, determine an Rx beam indication based on a detected Rx beam direction of the first directional Rx training signal, and to cause said transmitter to transmit the Rx beam indication in the directional Tx training signal during a Tx mode of one or more second beamforming training sequences until successful receipt, at the receiver, of a second directional Rx training signal, which includes the Tx beam indication of the detected Tx beam direction of the transmitter.

14. The first wireless communication device of claim 13, wherein said transmitter is to change a Tx beam direction of the directional Tx training signal between repetitions of the beamforming training sequence.

15. The first wireless communication device of claim 14, wherein said controller is to determine a prioritized order of a plurality of beam directions, and to change the Tx beam direction of the directional Tx training signal according to the prioritized order.

16. The first wireless communication device of claim 13, wherein the controller is configured to, when the first directional Rx training signal includes the Tx beam indication of the detected Tx beam direction of said transmitter, cause said transmitter to transmit the directional Tx training signal including the Rx beam indication in the detected Tx beam direction of said transmitter.

17. The first wireless communication device of claim 13 including a beamforming initiator (BI).

18. The first wireless communication device of claim 13 including a beamforming responder (BR).

19. A method of beamforming training at a first wireless communication device, the method comprising:
 performing a beamforming training sequence including a transmit (Tx) mode and a receive (Rx) mode, the Tx mode including transmitting a directional Tx training signal to a second wireless communication device, and said Rx mode including operating at an omnidirectional Rx state; and
 repeating the beamforming training sequence a plurality of times,
 wherein repeating the beamforming training sequence comprises detecting successful receipt, during an Rx mode of a first beamforming training sequence, of a first directional Rx training signal from the second wireless communication device, and, when the first directional Rx training signal does not include a TX beam indication of a detected ix beam direction of the first wireless communication device, determining an Rx beam indication based on a detected Rx beam direction of the first directional Rx training signal, and transmitting the Rx beam indication in the directional Tx training signal during a Tx mode of one or more second beamforming training sequences until successful receipt of a second directional Rx training signal, which includes the Tx beam indication of the detected Tx beam direction of the first wireless communication device.

20. The method of claim 19 comprising changing a Tx beam direction of the directional Tx training signal between repetitions of the beamforming training sequence.

21. The method of claim 19 comprising, when said first directional Rx training signal includes the Tx beam indication of the detected Tx beam direction of the first wireless communication device, transmitting the directional Tx training signal including the Rx beam indication in the detected Tx beam direction of the first wireless communication device.

22. A product including one or more tangible computer-readable non-transitory storage media comprising computer-executable instructions operable to, when executed by at least one processor, enable the at least processor to cause beamforming training at a first wireless communication device, the instructions, when executed, to cause the first wireless communication device to:

perform a beamforming training sequence including a transmit (Tx) mode and a receive (Rx) mode, the Tx mode including transmitting a directional Tx training signal to a second wireless communication device, and said Rx mode including operating at an omnidirectional Rx state; and repeat the beamforming training sequence a plurality of times, wherein repeating the beamforming training sequence comprises detecting successful receipt, during an Rx mode of a first beamforming training sequence, of a first directional Rx training signal from the second wireless communication device, and, when the first directional Rx training signal does not include a Tx beam indication of a detected Tx beam direction of the first wireless communication device, determining an Rx beam indication based on a detected Rx beam direction of the first directional Rx training signal, and transmitting the Rx beam indication in the directional Tx training signal during a Tx mode of one or more second beamforming training sequences until successful receipt of a second directional Rx training signal, which includes the Tx beam indication of the detected Tx beam direction of the first wireless communication device.

23. The product of claim 22, wherein the instructions, when executed, cause the first wireless communication device to change a Tx beam direction of the directional Tx training signal between repetitions of the beamforming training sequence.

24. The product of claim 23, wherein the instructions, when executed, cause the first wireless communication device to determine a prioritized order of a plurality of beam directions, and to change the Tx beam direction of the directional Tx training signal according to the prioritized order.

25. The product of claim 22, wherein the instructions, when executed, cause the first wireless communication device to, when said first directional Rx training signal includes the Tx beam indication of the detected Tx beam direction of said first wireless communication device, transmit the directional Tx training signal including the Rx beam indication in the detected Tx beam direction of said first wireless communication device.

* * * * *

UNITED STATES PATENT AND TRADEMARK OFFICE
CERTIFICATE OF CORRECTION

PATENT NO.       : 9,786,985 B2
APPLICATION NO.  : 14/469840
DATED            : October 10, 2017
INVENTOR(S)      : Joongheon Kim et al.

It is certified that error appears in the above-identified patent and that said Letters Patent is hereby corrected as shown below:

In the Claims

In Column 24, Line 39, in Claim 19, delete "ix" and insert -- Tx --, therefor.

Signed and Sealed this
Thirteenth Day of March, 2018

Andrei Iancu
*Director of the United States Patent and Trademark Office*